United States Patent
Kumar et al.

(10) Patent No.: US 11,556,855 B2
(45) Date of Patent: Jan. 17, 2023

(54) VARIATIONAL AUTOENCODING FOR ANOMALY DETECTION

(71) Applicant: SAP SE, Walldorf (DE)

(72) Inventors: Rajendra Kumar, Bangalore (IN); Rahul Choudhary, Samastipur (IN); Seshadri Chatterjee, Kolkata (IN)

(73) Assignee: SAP SE, Walldorf (DE)

( * ) Notice: Subject to any disclaimer, the term of this patent is extended or adjusted under 35 U.S.C. 154(b) by 421 days.

(21) Appl. No.: 16/882,151

(22) Filed: May 22, 2020

(65) Prior Publication Data

US 2021/0304067 A1  Sep. 30, 2021

(30) Foreign Application Priority Data

Mar. 31, 2020 (IN) .............................. 202011014179

(51) Int. Cl.
| | |
|---|---|
| *G06N 20/00* | (2019.01) |
| *G06K 9/62* | (2022.01) |
| *G06N 3/08* | (2006.01) |
| *G06N 3/04* | (2006.01) |

(52) U.S. Cl.
CPC ........... *G06N 20/00* (2019.01); *G06K 9/6262* (2013.01); *G06N 3/088* (2013.01); *G06N 3/0454* (2013.01); *G06N 3/082* (2013.01)

(58) Field of Classification Search
CPC ...... G06N 20/00; G06N 3/088; G06N 3/0454; G06N 3/082; G06K 9/6262
See application file for complete search history.

(56) References Cited

U.S. PATENT DOCUMENTS

| | | | |
|---|---|---|---|
| 10,616,257 B1 * | 4/2020 | Soulhi | ................ H04L 63/1425 |
| 10,956,808 B1 * | 3/2021 | Bhardwaj | ............ G06N 3/0445 |
| 2017/0206464 A1 | 7/2017 | Clayton et al. | |
| 2017/0293542 A1 | 10/2017 | Xu et al. | |
| 2018/0336452 A1 | 11/2018 | Tschernezki et al. | |
| 2018/0336460 A1 | 11/2018 | Tschernezki et al. | |

(Continued)

OTHER PUBLICATIONS

Ellefsen, A.L. et al., "Remaining useful life predictions for turbofan engine degradation using semi-supervised deep architecture," Reliability Engineering and System Safety, 183 (2019) 240-251.

(Continued)

*Primary Examiner* — Fayyaz Alam
(74) *Attorney, Agent, or Firm* — Mintz Levin Cohn Ferris Glovsky and Popeo, P.C.

(57) ABSTRACT

A machine learning model including an autoencoder may be trained based on training data that includes sequences of non-anomalous performance metrics from an information technology system but excludes sequences of anomalous performance metrics. The trained machine learning model may process a sequence of performance metrics from the information technology system by generating an encoded representation of the sequence of performance metrics and generating, based on the encoded representation, a reconstruction of the sequence of performance metrics. An occurrence of the anomaly at the information technology system may be detected based on a reconstruction error present in reconstruction of the sequence of performance metrics. Related systems, methods, and articles of manufacture are provided.

18 Claims, 9 Drawing Sheets

(56) References Cited

U.S. PATENT DOCUMENTS

2021/0256392 A1* 8/2021 Chen .................. G06N 3/082
2022/0230085 A1* 7/2022 Yamada ............. H04L 63/1425

OTHER PUBLICATIONS

Guo, Y. et al. "Multidemensional Time Series Anomaly Detection: A GRU-based Gaussian Mixture Variational Autoencoder Approach," Proceedings of Machine Learning Research, 95:97-112, 2018 (16 pages).

Kingma, D.P. et al. "Semi-supervised Learning with Deep Generative Models," arXiv: 1406.5298v2, Oct. 31, 2014. (9 pages).

Park, D. et al., "A Multimodal Anamoly Detector for Robot-Assisted Feeding Using an LSTM-based Variational Autoencoder," arXiv:1711.00614v1, Nov. 2, 2017 (8 pages).

Yoon, A.S. et al. "Semi-supervised Learning with Deep Generative Models for Asset Failure Prediction," arXiv:1709.00845v1, Sep. 4, 2017 (9 pages).

* cited by examiner

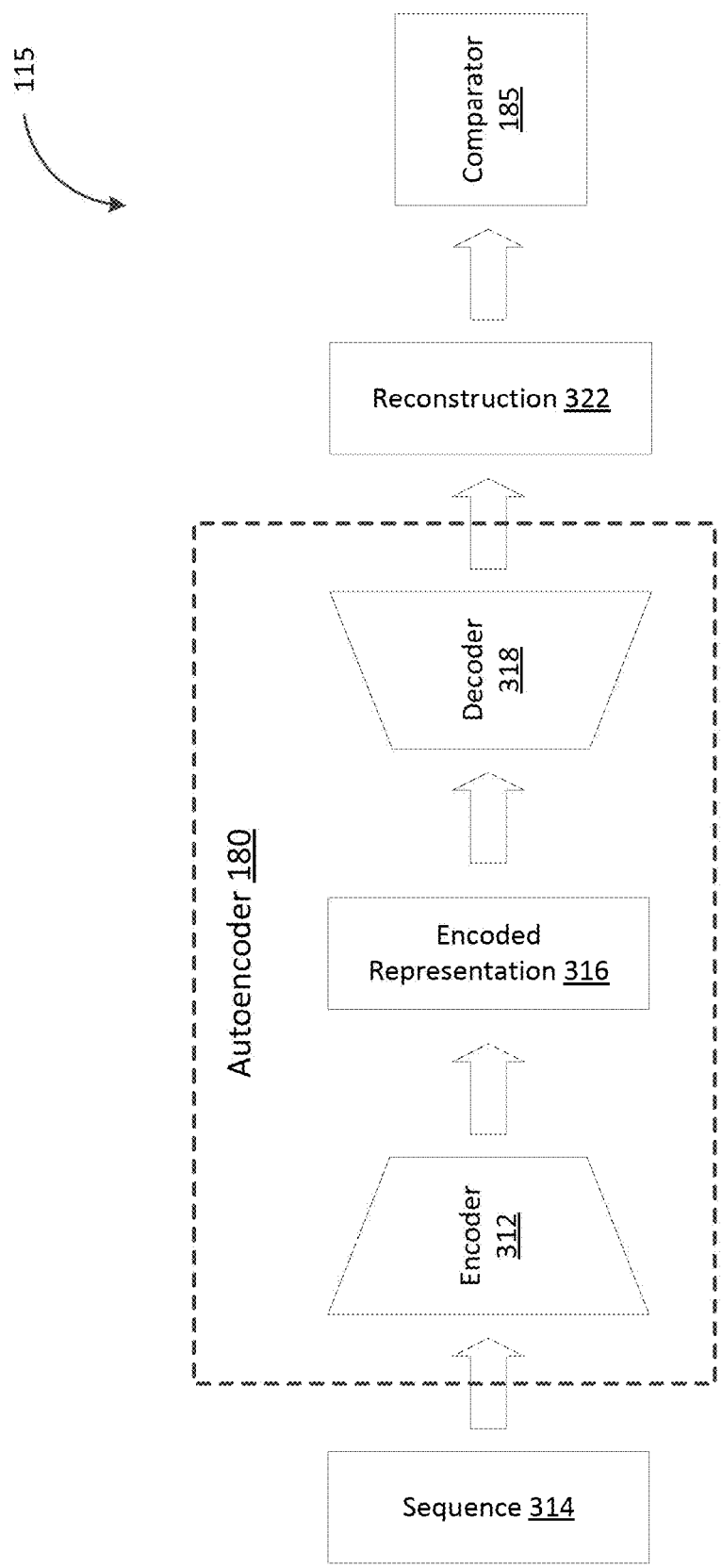

VARIATIONAL AUTOENCODING FOR ANOMALY DETECTION

CROSS-REFERENCE TO RELATED APPLICATION

The present application claims priority to Indian Provisional Patent Appl. No. 202011014179, filed Mar. 31, 2020, and entitled "VARIATIONAL AUTOENCODING FOR ANOMALY DETECTION," and incorporates its disclosure herein by reference in its entirety.

TECHNICAL FIELD

The subject matter described herein relates generally to machine learning and more specifically to a variational autoencoder for detecting anomalies during the operation of an information technology (IT) system.

BACKGROUND

The operation of an enterprise may rely on an information technology (IT) infrastructure that includes hardware, software, networks, and facilities. For example, the information technology infrastructure may include a database be configured to store a plurality of electronic data records. These data records may be organized, in accordance with a database schema, into various database objects including, for example, one or more database tables. The database is coupled with a database management system (DBMS), which may be configured to support a variety of database operations for accessing the data records stored in the database. These database operations may include, for example, structured query language (SQL) queries and/or the like.

SUMMARY

Systems, methods, and articles of manufacture, including computer program products, are provided for detecting anomalies during the operation of an information technology system. In one aspect, there is provided a system. The system may include at least one data processor and at least one memory. The at least one memory may store instructions that result in operations when executed by the at least one data processor. The operations may include: processing, with a machine learning model, a sequence of performance metrics from an information technology system, the processing includes generating, by the machine learning model, an encoded representation of the sequence of performance metrics, and the processing further includes the machine learning model generating, based at least on the encoded representation, a reconstruction of the sequence of performance metrics; and detecting, based at least on a reconstruction error present in reconstruction of the sequence of performance metrics, an occurrence of the anomaly at the information technology system.

In some variations, one or more features disclosed herein including the following features may optionally be included in any feasible combination. The machine learning model may be trained, based at least on training data, to detect the anomaly at the information technology system. The training data may include one or more sequences of non-anomalous performance metrics associated with a non-anomalous operation at the information technology system. The training data may exclude one or more sequences of anomalous performance metrics associated with the anomaly occurring at the information technology system.

In some variations, the machine learning model may include an encoder trained to generate, based at least on the sequence of performance metrics, the encoded representation.

In some variations, the machine learning model may further include a decoder trained to generate, based at least on the encoded representation, the reconstruction of the sequence of performance metrics.

In some variations, the encoder and the decoder may each comprise a long short-term memory neural network.

In some variations, the sequence of performance metrics may include values for at least one performance metric measured at two or more successive time intervals at the information technology system. The at least one performance metric may include an average quantity of host resident memory, an average quantity of host memory used, a quantity of column store unloads, an average ping length, a count of out of memory events in index server trace file, and/or an average size of host swap.

In some variations, the reconstruction error may include a difference between the sequence of performance metrics and the reconstruction of the sequence of performance metrics.

In some variations, the occurrence of the anomaly at the information technology system may be detected based at least on the reconstruction error exceeding a threshold value.

In some variations, the anomaly may include a memory outage at the information technology system.

In some variations, the information technology system may include a plurality of interconnected managed objects, and wherein the plurality of interconnected managed objects include one or more databases, hosts, application servers, and/or network devices.

In another aspect, there is provided a method for detecting anomalies during the operation of an information technology system. The method may include: processing, with a machine learning model, a sequence of performance metrics from an information technology system, the processing includes generating, by the machine learning model, an encoded representation of the sequence of performance metrics, and the processing further includes the machine learning model generating, based at least on the encoded representation, a reconstruction of the sequence of performance metrics; and detecting, based at least on a reconstruction error present in reconstruction of the sequence of performance metrics, an occurrence of the anomaly at the information technology system.

In some variations, one or more features disclosed herein including the following features may optionally be included in any feasible combination. The method may further include: training, based at least on training data, the machine learning model to detect the anomaly at the information technology system, the training data including one or more sequences of non-anomalous performance metrics associated with a non-anomalous operation at the information technology system, and the training data excluding one or more sequences of anomalous performance metrics associated with the anomaly occurring at the information technology system.

In some variations, the machine learning model may include an encoder trained to generate, based at least on the sequence of performance metrics, the encoded representation. The machine learning model may further include a decoder trained to generate, based at least on the encoded representation, the reconstruction of the sequence of performance metrics.

In some variations, the sequence of performance metrics may include values for at least one performance metric measured at two or more successive time intervals at the information technology system. The at least one performance metric may include an average quantity of host resident memory, an average quantity of host memory used, a quantity of column store unloads, an average ping length, a count of out of memory events in index server trace file, and/or an average size of host swap.

In some variations, the reconstruction error may include a difference between the sequence of performance metrics and the reconstruction of the sequence of performance metrics. The occurrence of the anomaly at the information technology system may be detected based at least on the reconstruction error exceeding a threshold value.

In some variations, the anomaly may include a memory outage at the information technology system.

In some variations, the information technology system may include a plurality of interconnected managed objects, and wherein the plurality of interconnected managed objects include one or more databases, hosts, application servers, and/or network devices.

In another aspect, there is provided a computer program product that includes a non-transitory computer readable storage medium. The non-transitory computer-readable storage medium may include program code that causes operations when executed by at least one data processor. The operations may include: processing, with a machine learning model, a sequence of performance metrics from an information technology system, the processing includes generating, by the machine learning model, an encoded representation of the sequence of performance metrics, and the processing further includes the machine learning model generating, based at least on the encoded representation, a reconstruction of the sequence of performance metrics; and detecting, based at least on a reconstruction error present in reconstruction of the sequence of performance metrics, an occurrence of the anomaly at the information technology system.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to the detection of anomalies during the operations of a database, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations.

In the drawings,

FIG. 3A depicts a block diagram illustrating an example of a machine learning model, in accordance with some example embodiments;

When practical, similar reference numbers denote similar structures, features, or elements.

DETAILED DESCRIPTION

Figure 1A:
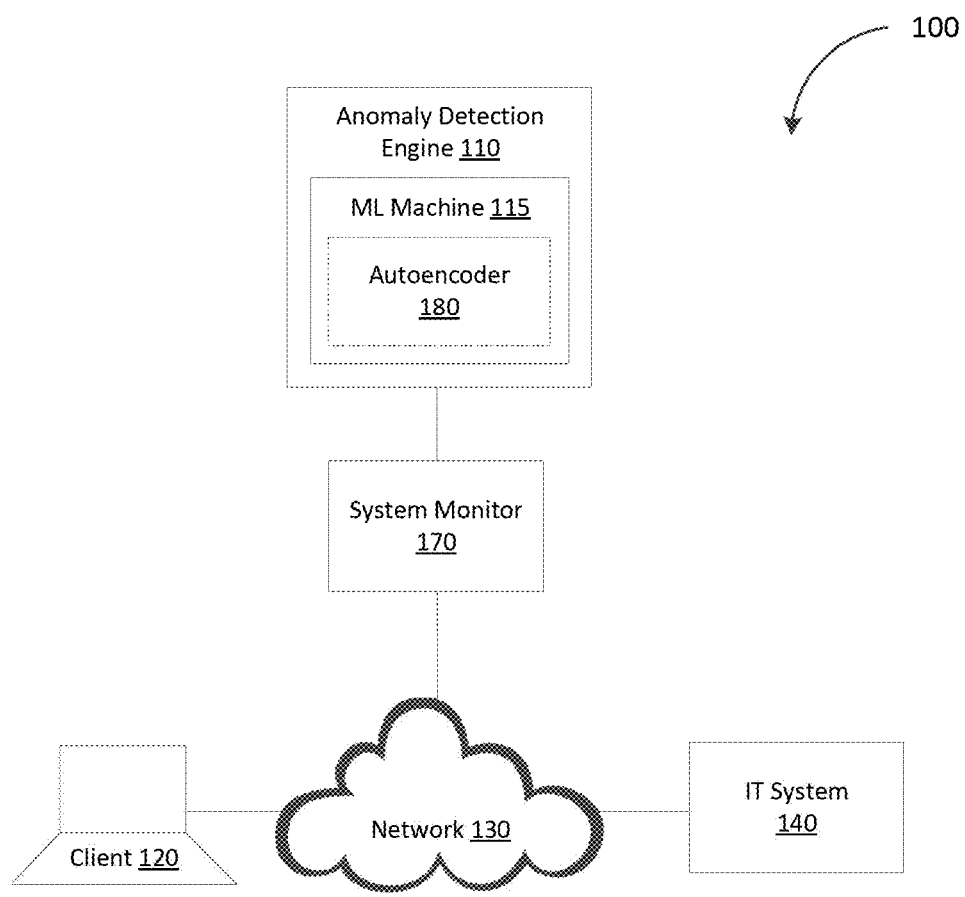
FIG. 1A depicts a system diagram illustrating a machine learning based anomaly detection system, in accordance with some example embodiments.

An information technology (IT) system may encounter one or more anomalies during its operation. For example, the information technology system may encounter a memory outage when a database system included in information technology system lacks sufficient random access memory (RAM) to accommodate data required to perform an operation such as, for example, an aggregation, a calculation, and/or the like. Memory outages tend to be unpredictable. Thus, when a memory outage does occur at the information technology system, the result may be costly downtime and a severe compromise to the reliability of the information technology system. Accordingly, in some example embodiments, the information technology system may be coupled with an anomaly detection engine configured to detect the occurrence of one or more anomalies at the information technology system during an upcoming time interval including, for example, a memory outage and/or the like.

In some example embodiments, the anomaly detection engine may detect the occurrence of one or more anomalies at the information technology system during the upcoming time interval by at least processing, with a machine learning model, a sequence of one or more performance metrics associated with the information technology system. The machine learning model may be trained to detect, based at least on the sequence of one or more performance metrics associated with the information technology system, one or more anomalies including, for example, a memory outage. The sequence of one or more performance metrics may include any performance metric that may be indicative of an operational state of the information technology system including, for example, an average quantity of host resident memory, an average quantity of host memory used, a quantity of column store unloads, an average ping response time, a count of out of memory events in database trace files, an average size of host memory swap operations, and/or the like. Moreover, the sequence of one or more performance metrics may include, for example, at least one performance metric received and/or collected from the information technology system at successive time intervals including, for example, a first time interval, a second time interval, a third time interval, and/or the like.

The machine learning model may include an autoencoder trained to encode sequences of performance metrics associated with the information technology system. In some example embodiments, the autoencoder may be trained based on training data that includes one or more sequences of non-anomalous performance metrics but excludes sequences of anomalous performance metrics. Trained in this manner, the autoencoder may be able to encode sequences of non-anomalous performance metrics with minimal reconstruction error. Contrastingly, the autoencoder may be unable to encode sequences of anomalous performance metrics with minimal reconstruction error. Accordingly, the machine learning model may detect an anomaly at the information technology system based at least on the reconstruction error associated with a sequence of performance metrics from the information technology system. For example, the machine learning model may detect an anomaly at the information technology system if the reconstruction error associated with the sequence of performance metrics exceeds a threshold value.

FIG. 1A depicts a system diagram illustrating an example of a machine learning based anomaly detection system 100, in accordance with some example embodiments. Referring to FIG. 1A, the machine learning based anomaly detection system 100 may include an anomaly detection engine 110, a client 120, an information technology system 140, and a system monitor 170. As shown in FIG. 1A, the anomaly detection engine 110, the client 120, the information technology system 140, and/or the system monitor 170 may be communicatively coupled via a network 130. It should be appreciated that the network 130 may be any wired and/or wireless network including, for example, a wide area network (WAN), a local area network (LAN), a virtual local area network (VLAN), a public land mobile network (PLMN), the Internet, and/or the like.

Figure 1B:
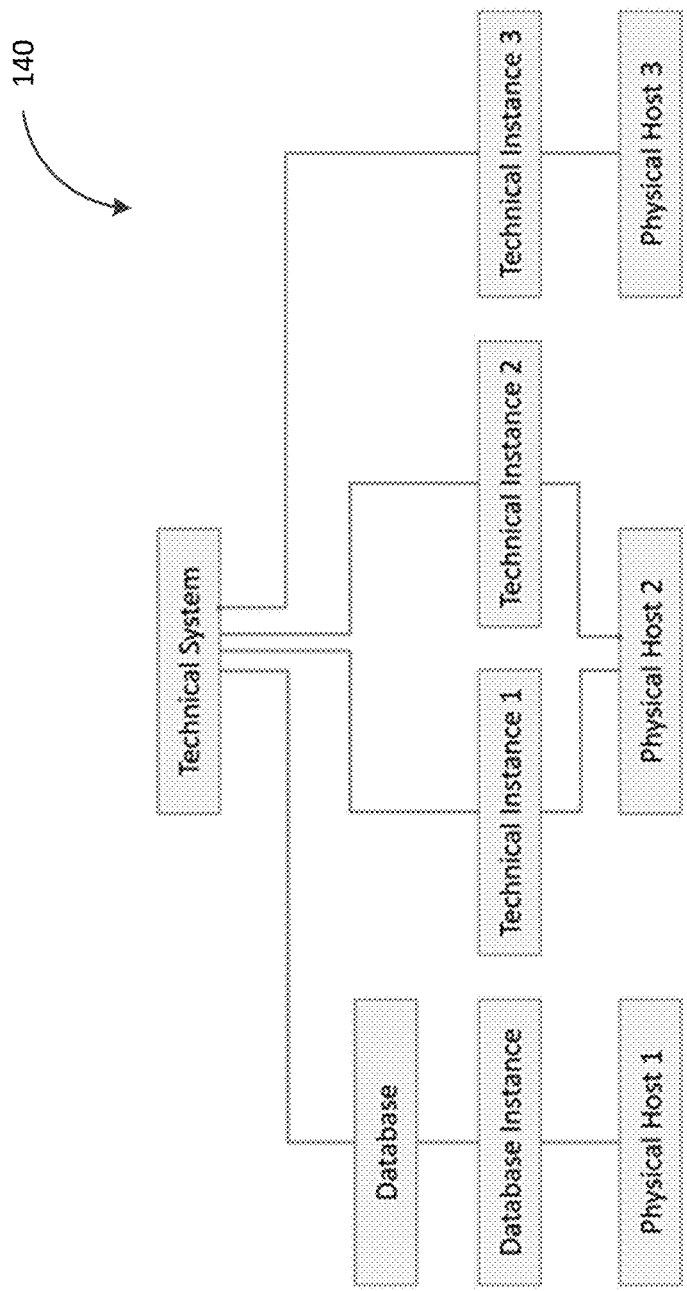
FIG. 1B depicts a block diagram illustrating an example of an information technology (IT) system, in accordance with some example embodiments.

FIG. 1B depicts a block diagram illustrating a topology of an example of the information technology system 140, in accordance with some example embodiments. Referring to FIG. 1B, the information technology system 140 may include a plurality of physically interconnected and/or logically interconnected components known as "managed objects." Two or more managed objects may be interconnected individually and/or in groups that form a "family of managed objects." Due to the interconnection between the managed objects, the behavior of one managed object or one family of managed objects may impact the behavior of other managed objects and/or families of managed objects. Examples of managed objects included in the information technology system 140 may include databases, hosts, application servers, network devices (e.g., hypervisors, switches, and routers), and/or the like.

Referring again to FIGS. 1A-B, one example of a managed object included in the information technology system 140 may be a database system having a database management system (DBMS) and a database. The database may be any type of database including, for example, an in-memory database, a relational database, a non-SQL (NoSQL) database, and/or the like. Meanwhile, the database management system may be configured to respond to one or more queries from the client 120 to access the database. The database management system may respond to the queries by performing one or more database operations including, for example, aggregations, calculations, and/or the like.

The performance of the one or more database operations may require the database management system to load data from the database to a random access memory (RAM) at the database management system. An example of an anomaly at the information technology system 140 including the database system may include when the random access memory is unable to accommodate the data being loaded from the database. Such a memory outage may cause a shutdown of the database system, thereby giving rise to costly downtime and compromising the overall reliability of the information technology system 140.

In some example embodiments, the anomaly detection engine 110 may be configured to detect the occurrence of one or more anomalies at the information technology system 140 during an upcoming time interval including, for example, memory outages in which the random access memory is no longer able to accommodate data being loaded form the database to respond to one or more queries from the client 120. As shown in FIG. 1A, the anomaly detection engine 110 may be coupled with the system monitor 170, which may be configured to collect, from the information technology system 140, raw performance metrics. It should be appreciated that the information technology system 140 may be deployed across multiple hosts. As such, the system monitor system 170 may be further configured to separate raw performance metrics collected from different hosts and preprocess the raw performance metrics before sending, to the anomaly detection engine 110, the preprocessed performance metrics.

The system monitor 170 may perform preprocessing that includes normalization of the raw performance metrics collected from the information technology system 140. For example, the normalization of the raw performance metrics may include determining an average value, a maximum value, a minimum value, and/or a sum value of at least some of the raw performance metrics. Alternatively and/or additionally, at least some of the raw performance metrics collected from the information technology system 140 may be normalized into relative values (e.g., percentages, ratios, and/or the like) to remove distortions imposed, for example, due to system size. Accordingly, instead of operating on raw performance metrics, the anomaly detection engine 110 may operate on normalized performance metrics that correspond to one or more aggregate values and/or relative values determined based on the raw performance metrics.

In some example embodiments, the anomaly detection engine 110 may detect the occurrence of one or more anomalies at the information technology system 140 based on one or more performance metrics received and/or collected from the information technology system 140. These one or more performance metrics may include any performance metric that may be indicative of an operational state of the information technology system 140 including, for example, an average quantity of host resident memory, an average quantity of host memory used, a quantity of column store unloads, an average ping response time, a count of out of memory events in database trace files, an average size of host memory swap operations, and/or the like. To further illustrate, Table 1 below enumerates examples of performance metrics that may be used by the anomaly detection engine 110 to predict the occurrence of one or more anomalies at the information technology system 140 during the upcoming time interval. The concrete list of metrics may depend on the architecture attributes of a managed object. For example, for a database system, the metrics may depend on the attributes of the database including, for example, in memory, relational, non-SQL, column oriented storage, row oriented storage, distributed database, parallel database, and/or the like.

encode sequences of non-anomalous performance metrics with minimal reconstruction error. Contrastingly, the autoencoder 180 may be unable to encode sequences of anomalous performance metrics with minimal reconstruction error. Accordingly, the machine learning model 115 may detect an anomaly at the information technology system 140 based at least on the reconstruction error associated with a sequence of performance metrics from the information technology system 140. For example, the machine learning model 115 may detect an anomaly at the information technology system 140 if the reconstruction error associated with the sequence of performance metrics exceeds a threshold value.

In some example embodiments, the machine learning model 115 may be trained to process one or more performance metrics that are received and/or collected from the information technology system 140 at successive time intervals. To further illustrate, Table 2 below depicts a sequence of six different performance metrics (e.g., M1, M2, M3, M4, M5, and M6) that have been received and/or collected from the information technology system 140 at six successive time intervals (e.g., T0, T1, T2, T3, T4, and T5). As noted, the machine learning model 115 may be trained based on

TABLE 1

| Metric ID | Metric Name | Metric Description |
|---|---|---|
| M1 | AVG_HOST_MEM_RES_PCT | Measures an average percentage of resident memory (e.g., physically allocated in random access memory (RAM)) in relation to a total quantity of physically available random access memory per host. |
| M2 | AVG_HOST_MEM_USED_PCT | Measures an average percentage of memory used by all database processes per database host in relation to a corresponding sum of all database service memory allocation limits running on that host. |
| M3 | Column Store Unloads - Host Specific | Quantity of column store table unloads triggered by memory shortage per database host. |
| M4 | AVG_PING_MS | Current ping time associated with ping requests from a nameserver to other services within a database system. Ping requests may be performed periodically (e.g., every 10 seconds and/or a different time interval) and the result of the ping requests may be measured in milliseconds (or a different unit of measurement). |
| M5 | Quantity of Out of Memory Events in Database Trace File | Quantity of database operations aborted within a to a demand overload at the main memory. |
| M6 | Average host memory swap operations in MB | Average amount of main memory swapped out on the database management system host(s) to external swap space by the operating system in order to free up main memory required to satisfy current memory requests from the database management system. |

In some example embodiments, the anomaly detection engine 110 may detect the occurrence of the one or more anomalies at the information technology system 140 by at least processing, using a machine learning model 115, the one or more performance metrics received and/or collected from the information technology system 140. The machine learning model 115 may include an autoencoder 180 trained to encode sequences of performance metrics associated with the information technology system 140. The autoencoder 180 may be trained based on training data that includes one or more sequences of non-anomalous performance metrics but excludes sequences of anomalous performance metrics. Trained in this manner, the autoencoder 180 may be able to training data that excludes sequence of anomalous performance metrics, which may be received and/or collected from the information technology system 140 prior to and/or during the occurrence of an anomaly such as an out of memory event. Accordingly, the sequence of six different performance metrics (e.g., M1, M2, M3, M4, M5, and M6) may have been received and/or collected from the information technology system 140 at six successive time intervals (e.g., T0, T1, T2, T3, T4, and T5) during which the information technology system 140 is operating normally.

As shown in Table 2, at each of the time intervals T0, T1, T2, T3, T4, and T5, the anomaly detection engine 110 may receive and/or collect, from the information technology system 140, a set of values for each of the six performance metrics M1, M2, M3, M4, M5, and M6.

TABLE 2

| Time Interval | M1 | M2 | M3 | M4 | M5 | M6 |
|---|---|---|---|---|---|---|
| T5 | $v_{1,5}$ | $v_{2,5}$ | $v_{3,5}$ | $v_{4,5}$ | $v_{5,5}$ | $v_{6,5}$ |
| T4 | $v_{1,4}$ | $v_{2,4}$ | $v_{3,4}$ | $v_{4,4}$ | $v_{5,4}$ | $v_{6,4}$ |
| T3 | $v_{1,3}$ | $v_{2,3}$ | $v_{3,3}$ | $v_{4,3}$ | $v_{5,3}$ | $v_{6,3}$ |
| T2 | $v_{1,2}$ | $v_{2,2}$ | $v_{3,2}$ | $v_{4,2}$ | $v_{5,2}$ | $v_{6,2}$ |
| T1 | $v_{1,1}$ | $v_{2,1}$ | $v_{3,1}$ | $v_{4,1}$ | $v_{5,1}$ | $v_{6,1}$ |
| T0 | $v_{1,0}$ | $v_{2,0}$ | $v_{3,0}$ | $v_{4,0}$ | $v_{5,0}$ | $v_{6,0}$ |

For example, at the first time interval TO, the anomaly detection engine 110 may receive and/or collect, from the information technology system 140, a first set of values $S_1$ for the six performance metrics M1, M2, M3, M4, M5, and M6 that includes the values $v_{1,0}$, $v_{2,0}$, $v_{3,0}$, $v_{4,0}$, $v_{5,0}$, and $v_{6,0}$. At the second time interval T2, the anomaly detection engine 110 may receive and/or collect from the information technology system 140, a second set of values $S_2$ for the six performance metrics M1, M2, M3, M4, M5, and M6 that includes the values $v_{2,1}$, $v_{3,1}$, $v_{4,1}$, $v_{5,1}$, and $v_{6,1}$. The anomaly detection engine 110 may receive and/or collect additional sets of values from the information technology system 140 including, for example, $S_3$, $S_4$, $S_5$, and $S_6$ for the six performance metrics M1, M2, M3, M4, M5, and M6 during the subsequent time intervals T2, T3, T4, T5, and/or the like.

In some example embodiments, the machine learning model 115 may be trained to process the sets of values $S_1$, $S_2$, $S_3$, $S_4$, $S_5$, and $S_6$ for the six performance metrics M1, M2, M3, M4, M5, and M6 received during successive time intervals T0, T1, T2, T3, T4, T5, and/or the like, and detect a sequence of performance metrics indicative of the occurrence of an anomaly at the information technology system 140 during an upcoming time interval. For instance, upon processing the second set of value $S_2$, the third set of value $S_3$, and the fourth set of value $S_4$ received and/or collected from the information technology system 140 during the second time interval T1, the third time interval T2, and the fourth time interval T3, the machine learning model 115 may detect a sequence of performance metrics indicative of the occurrence of an anomaly at the information technology system 140 during an upcoming time interval such as, for example, within the next x quantity of time.

Figure 2A:
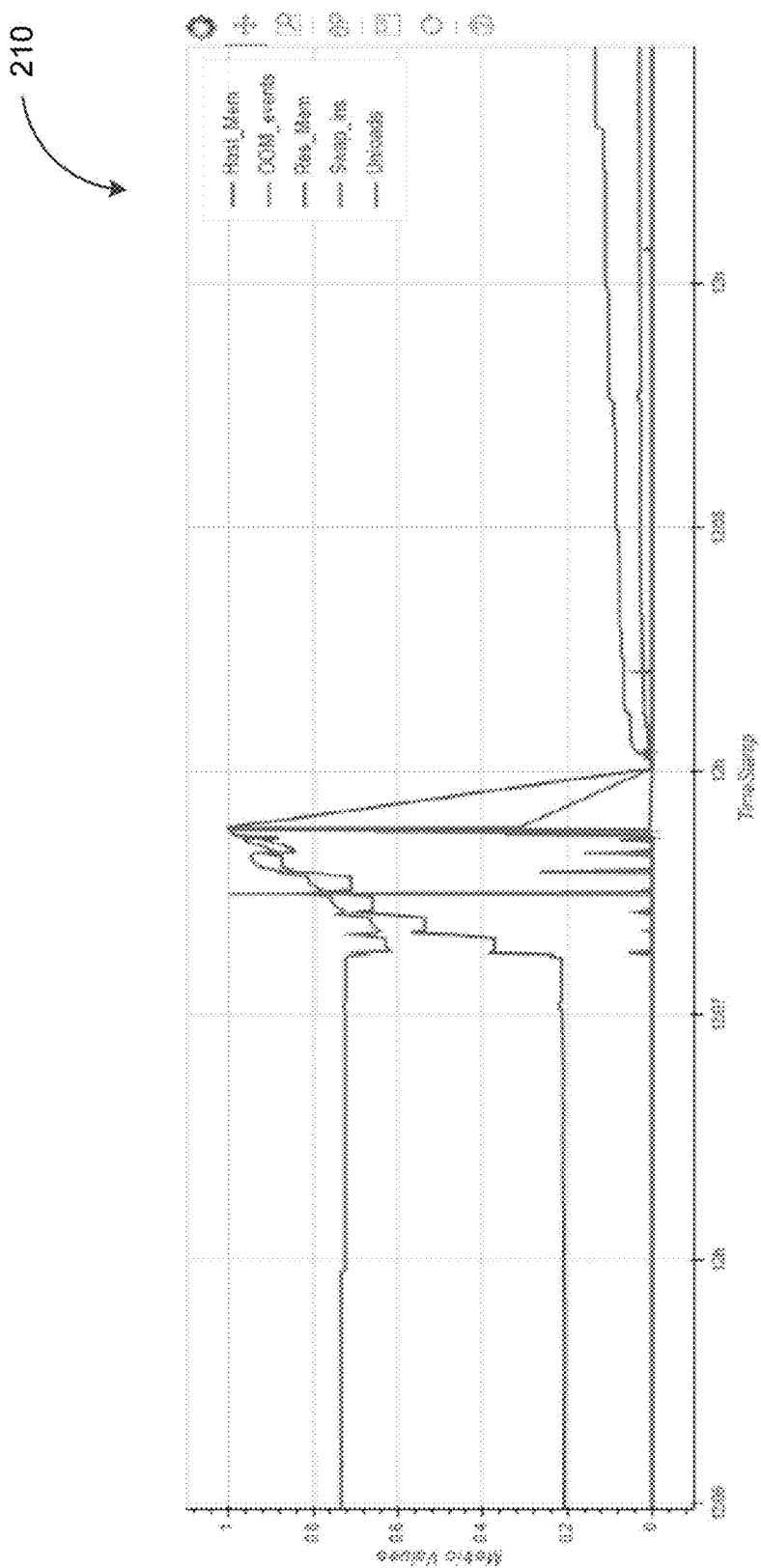
FIG. 2A depicts a graph illustrating an example sequence of performance metrics from a database system, in accordance with some example embodiments.

FIG. 2A depicts a graph 200 illustrating an example sequence of performance metrics from the information technology system 140, in accordance with some example embodiments. Referring to FIGS. 1 and 2A, the graph 200 includes a sequence of 864 records of performance metrics from the information technology system 140, which are collected at five minute intervals over a period of three days. The sequence of performance metrics depicted in the graph 200 include performance metrics indicative of an operational state of the information technology system 140 including, for example, average percentage of host memory used, average percentage of resident memory use, an average size of host memory swap operations, a quantity of column store unloads, and a count of out of memory events in database trace files.

The sequence of performance metrics depicted in the graph 200 may include non-anomalous performance metrics from a time period during which the information technology system 140 is operating normally as well as anomalous performance metrics from a time period during which an anomaly (e.g., an out of memory event and/or the like) occurred at the information technology system 140. For example, as shown in FIG. 2A, an out of memory event occurred at the information technology system 140 at 11:30 AM on December 7. Nevertheless, as noted, the machine learning model 115, for example, the autoencoder 180 may be trained based on training data that includes one or more sequences of non-anomalous performance metrics but excludes sequences of anomalous performance metrics. Trained in this matter, the autoencoder 180 may encode the sequences of non-anomalous performance metrics with minimal reconstruction error. Contrastingly, the reconstruction error associated with sequence of anomalous performance metrics, such as the performance metrics associated with the out of memory event at 11:30 AM on December 7, may be high. As such, the machine learning model 115 may detect an anomaly at the information technology system 140 based at least on the reconstruction error associated with a sequence of performance metrics from the information technology system 140 exceeding a threshold value.

Figure 2B:
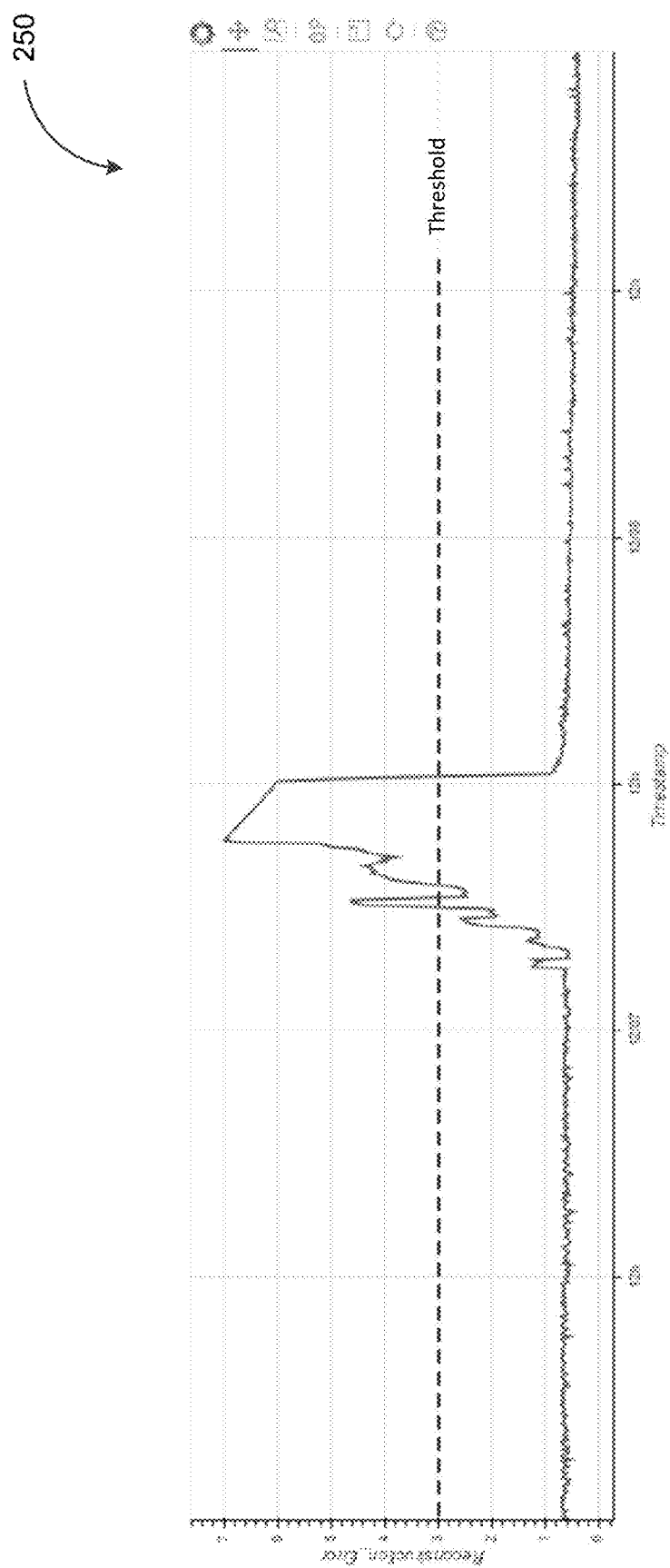
FIG. 2B depicts a graph illustrating the reconstruction error present in the performance metrics from an example of a database system, in accordance with some example embodiments.

To further illustrate, FIG. 2B depicts a graph 250 illustrating the reconstruction error associated with a sequence of performance metrics from the information technology system 140, in accordance with some example embodiments. As shown in FIG. 2B, the reconstruction error associated with the sequence of performance metrics shown in FIG. 2A remained low while the information technology system 140 is operating normally. However, the reconstruction error associated with sequence of performance metrics shown in FIG. 2A began to increase prior to the occurrence of the out of memory event at 11:30 AM on December 7. Furthermore, the reconstruction error associated with the sequence of performance metrics shown in FIG. 2A peaked at the time of the out of memory event before decreasing and remained low as the information technology system 140 resumes normal operation. Accordingly, the machine learning model 115 may detect the out of memory event at the information technology system 140, for example, prior to the occurrence of the out of memory event, based at least on the reconstruction error associated with a sequence of performance metrics from the information technology system 140 shown in FIG. 2A exceeding a threshold value.

FIG. 3A depicts a block diagram illustrating an example of the machine learning model 115, in accordance with some example embodiments. Referring to FIGS. 1 and 3A, the machine learning model 115 may include the autoencoder 180 and a comparator 185. As shown in FIG. 3A, the autoencoder 180 may include an encoder 312 and a decoder 318. In some example embodiments, the encoder 312 may receive and/or collector, from the information technology system 140, a sequence 314 of performance metrics associated with the information technology system 140. The encoder 312 may be trained to generate an encoded representation 316 of the sequence 314 of performance metrics while the decoder 318 may be trained to generate, based at least on the encoded representation 316, a reconstruction 322 of the sequence 314 of performance metrics from the information technology system 140.

In some example embodiments, the autoencoder 180 may be trained based on training data that includes sequences of non-anomalous performance metrics but excludes sequences of anomalous performance metrics. As such, if the sequence 314 of performance metrics from the information technology system 140 includes anomalous performance metrics, the encoder 312 may be unable to generate the encoded representation 316 such that a minimal reconstruction error is present in the reconstruction 322 of the sequence 314 of performance metrics generated based on the encoded representation 316. Accordingly, the machine learning model 115 may detect, based at least on a reconstruction error present in the reconstruction 322 of the sequence 314 of performance metrics from the information technology system 140, an anomaly at the information technology system 140. For example, the comparator 185 may determine, based at least on a difference between the sequence 314 and the reconstruction 322, a value corresponding to a reconstruction error present in the encoded representation 316 of the sequence 314. The machine learning model 115 may detect an anomaly at the information technology system 140, for example, during an upcoming time interval, when the reconstruction error exceeds a threshold value.

In some example embodiments, the encoder 312 and the decoder 318 may each be a recurrent neural network (RNN) including, for example, a long short-term memory (LSTM) neural network and/or the like. However, it should be appreciated that the encoder 312 and the decoder 318 may be implemented as any type of machine learning model including, for example, a regression model, an instance-based model, a regularization model, a decision tree, a random forest, a Bayesian model, a clustering model, an associative model, a deep learning model, a dimensionality reduction model, an ensemble model, and/or the like. A long short-term memory neural network may be capable of processing a sequence of performance metrics collected and/or received from the information technology system 140 and recognizing dependencies amongst the performance metrics that are collected and/or received across multiple successive time intervals. Recognizing these dependencies may enable the encoder 312 to generate the encoded representation 316 as well as enable the decoder 318 to generate the reconstruction 322 of the sequence 314 based on the encoded representation 316.

Figure 3B:
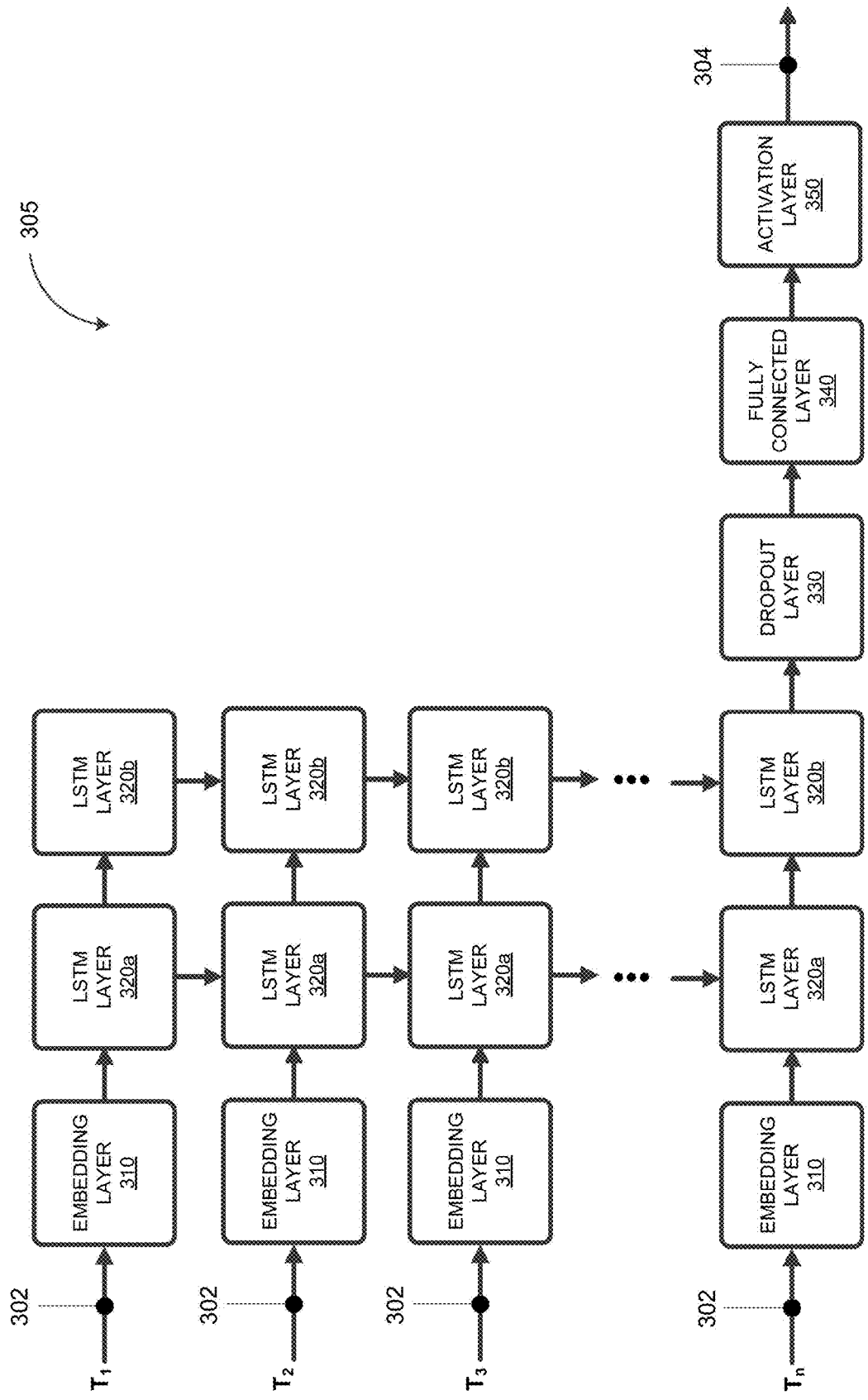
FIG. 3B depicts an example of a long short-term memory network, in accordance with some example embodiments.

FIG. 3B depicts a long short-term memory neural network 305, in accordance with some example embodiments. Referring to FIGS. 3A-B, the long short-term memory neural network 305 may implement the encoder 312 included in the machine learning model 115 which, as noted, may be configured to generate the encoded representation 316 of the sequence 314 of performance metrics from the information technology system 140. Alternatively and/or additionally, the long short-term memory neural network 305 may implement the decoder 318 included in the machine learning model 115, which may be configured to generate, based at least on the encoded representation 316, the reconstruction 322 of the sequence 314 of performance metrics from the information technology system 140.

In some example embodiments, the operations of the long short-term memory neural network 305 may be performed in separate stages that correspond to the individual layers. Referring to FIG. 3B, the long short-term memory neural network 305 may include an embedding layer 310, a first long short-term memory layer 320a, a second long short-term memory layer 320b, a dropout layer 330, a fully connected layer 340, and an activation layer 350. However, it should be appreciated that the long short-term memory neural network 305 may include different layers than show including, for example, a different quantity of long short-term memory layers.

One or more operations may be performed at each of the embedding layer 310, the first long short-term memory layer 320a, the second long short-term memory layer 320b, the dropout layer 330, the fully connected layer 340, and the activation layer 350 in order to process a sequence of performance metrics collected and/or received from the information technology system 140 and detect a sequence of performance metrics indicative of the occurrence of an anomaly at the information technology system 140 during an upcoming time interval.

In some example embodiments, where the long short-term memory neural network 305 implements the encoder 312, the long short-term memory neural network 305 may receive, at an input 302, the sequence 314 of performance metrics and provide, at an output 304, an encoded representation 316 of the sequence 314 of performance metrics. Alternatively, where the long short-term memory neural network 305 implements the decoder 318, the long short-term memory neural network 305 may receive, at the input 302, the encoded representation 316 of the sequence 314 of the performance metrics and provide, at the output 304, a reconstruction 322 of the sequence 314 of performance metrics.

In some example embodiments, where the long short-term memory neural network 305 implements the encoder 312, the embedding layer 310 may be configured to encode the sequence 314 of performance of metrics collected and/or received from the information technology system 140. The sequence 314 of performance metrics received and/or collected from the information technology system 140 may include one or more performance metrics indicative of the operational state of the information technology system 140 including, for example, an average quantity of host resident memory, an average quantity of host memory used, a quantity of column store unloads, an average ping length, a count of out of memory events in index server trace file, an average size of host swap, and/or the like. Moreover, the sequence 314 of performance metrics may include performance metrics that are collected and/or received from the information technology system 140 at successive time intervals.

As shown in Table 2, the sequence 314 of performance metrics may include individual sets of values for different performance metrics (e.g., M1, M2, M3, M4, M5, and M6) collected and/or received from the information technology system 140 at successive time intervals (e.g., T0, T1, T2, T3, T4, and T5). For example, the first set of values $S_1$ received and/or collected from the information technology system 140 during the first time interval T0 may include the values $v_{1,0}$, $v_{2,0}$, $v_{3,0}$, $v_{4,0}$, $v_{5,0}$, and $v_{6,0}$ while the second set of values $S_2$ received and/or collected from the information technology system 140 during the second time interval T1 may include the values $v_{2,1}$, $v_{3,1}$, $v_{4,1}$, $v_{5,1}$, and $v_{6,1}$. Accordingly, the embedding layer 310 may encode each set of values into a corresponding vector, thereby generating a sequence of vector representations ($v_1$, $v_2$, ... $v_n$) for the sequence of performance metrics collected and/or received from the information technology system 140. For instance, the embedding layer may generate a first vector $v_1 = [v_{1,0}, v_{2,0}, v_{3,0}, v_{4,0}, v_{5,0}, v_{6,0}]$ for the first set of values $S_1$ received and/or collected from the information technology system 140 during the first time interval T0 and a second vector $v_2 = [v_{1,1}, v_{2,1}, v_{3,1}, v_{4,1}, v_{5,1}, v_{6,1}]$ for the second set of values $S_2$ received and/or collected from the information technology system 140 during the first time interval T1.

In some example embodiments, the first long short-term memory layer 250a may be configured to process the sequence of vector representations ($v_1$, $v_2$, ... $v_n$) generated by the embedding layer 310 for the sequence 314 of performance metrics collected and/or received from the information technology system 140. The first long short-term memory layer 250a may process the tokens sequentially. For example, the first long short-term memory layer 250a may process the sequence of n vectors ($v_1$, $v_2$, ... $v_n$) by at least processing the vectors one by one starting at the vector first $v_1$ corresponding to the first set of values $S_1$ of the performance metrics collected and/or received from the information technology system 140 at the first time interval T1, followed by the second vector $v_2$ corresponding to the second set of values $S_2$ of the performance metrics collected and/or received from the information technology system 140 at the second time interval T2, and ending at the n-th vector $v_n$ corresponding to the n-th set of values $S_n$ of performance metrics collected and/or received from the information technology system 140 at an n-th time interval Tn.

Information from previous sets of values processed by the first long short-term memory layer 320a may be selectively accumulated, retained, and/or passed onto subsequent processing stages when the first long short-term memory layer 320a processes subsequent sets of values. According to some example embodiments, information from previous sets of values processed by the first long short-term memory layer 320a may further be selectively passed onto subsequent long short-term memory layers including, for example, the second long short-term memory layer 320b. The second long short-term memory layer 320b may process information from the first long short-term memory layer 320a and may selectively accumulate, retain, and pass information onto subsequent processing stages when the second long short-term memory layer 320b processes additional information from the first long short-term memory layer 320a.

Because the first long short-term memory layer 320a and the second long short-term memory layer 320b may both have memory to retain at least some of the information that was processed by the first long short-term memory layer 320a and the second long short-term memory layer 320b, the first long short-term memory layer 320a and the second long short-term memory layer 320b may be trained to recognize interdependencies amongst the sequence 314 of performance metrics collected and/or received from the information technology system 140. Moreover, the first long short-term memory layer 320a and the second long short-term memory layer 320b may encode, in accordance with these interdependencies, the sequence 314 of performance metrics collected and/or received from the information technology system 140 to generate the encoded representation 316. For example, the first long short-term memory layer 320a may retain one set of values while it continues to process one or more sets of values. When the first long short-term memory layer 320a subsequently encounters another set of value, the first long short-term memory layer 320a may be able to recognize an interdependency between the successive sets of values and encode the successive sets of values accordingly.

Although the long short-term memory neural network 305 is shown to include the first long short-term memory layer 320a and the second long short-term memory layer 320b, it should be appreciated that the long short-term memory neural network 305 may include a different quantity of long short-term memory layers. Where the long short-term memory neural network 305 includes one or more additional long short-term memory layers, each additional long short-term memory layer may be configured to further selectively process, accumulate, and/or pass on information received from previous long short-term memory layers.

Referring again to FIG. 3B, the dropout layer 330 may be configured to remove (e.g., drop out) at least some of the output from the second long short-term memory layer 320b. The operations of one or more preceding long short-term memory layers (e.g., the first long short-term memory layer 320a and/or the second long short-term memory layer 320b) may introduce sampling noise, which may cause overfitting at the subsequent fully connected layer 140. As such, the dropout layer 330 may prevent overfitting by omitting at least some of the outputs from the second long short-term memory layer 320b in accordance with a certain probability p. For instance, outputs from the second long short-term memory layer 320b may be dropped out a p proportion of the time and may be passed onto the fully connected layer 340 the remaining (1−p) proportion of the time.

In some example embodiments, the outputs from the dropout layer 330 may be passed onto the fully connected layer 340, which may be configured to perform one or more high level processing operations across the full set of output from the dropout layer 330. Meanwhile, the activation layer 350 may apply one or more activation functions to the output from the fully connected layer 340 to generate the output 304, which may be the encoded representation 316 or the reconstructed representation 322. For example, the activation layer 350 may apply Softmax activation function depicted by Equation (1) below:

$$P(y=j\mid x) = \frac{e^{x^T w_j}}{\sum_{k=1}^{K} e^{x^T w_k}} \qquad (1)$$

FIG. 3B further depicts a plurality of processing stages of long short-term memory neural network 305. As shown in FIG. 3B, the long short-term memory neural network 305 may receive, at the input 302, multiple sets of values (e.g., $S_1, S_2, \ldots, S_n$) for the performance metrics that are collected and/or received from the information technology system 140 at successive time intervals (e.g., $T_1, T_2, T_3, \ldots T_n$). As shown in FIG. 3B, the long short-term memory neural network 305 may be unfolded to show the successive stages of processing the n sets of values $S_1, S_2, \ldots, S_n$.

For example, the long short-term memory neural network 305 may receive the first set of values $S_1$ for performance metrics that are collected and/or received from the information technology system 140 at the first time interval $T_1$. The embedding layer 310 may generate a vector representation of the first set of values $S_1$ (e.g., the first vector $v_1$) while the first long short-term memory layer 320a may process the vector representation of the first set of values $S_1$. In some example embodiments, the first long short-term memory layer 320a may be configured to selectively retain and/or pass on information from processing the first set of values $S_1$. For instance, the first long short-term memory layer 320a may process the vector representation associated with the first set of values $S_1$ and determine whether to retain and/or pass on at least a portion of the resulting information to a next processing stage at the first long short-term memory layer 320a (e.g., for the second set of values $S_2$) and/or to a next long short-term memory layer including, for example, the second long short-term memory layer 320b.

As such, the first long short-term memory layer 320a may (or may not) utilize at least some of the information associated with the first set of values $S_1$ when the first long short-term memory layer 120 processes the next set of values (e.g., the second set of values $S_2$) in the sequence of performance metrics being processed by the long short-term memory neural network 305. Similarly, the second long short-term memory layer 320a may (or may not) apply further processing to at least some of the information from the processing of the first set of values $S_1$ by the first long short-term memory layer 320a.

Referring again to FIG. 3B, the first long short-term memory layer 320a may process the second set of values $S_2$ subsequent to processing the first set of values $S_1$. In doing so, the first long short-term memory layer 320a may selectively retain and/or pass on at least a portion of the resulting information to a next processing stage at the first long short-term memory layer 320a (e.g., for the subsequent third set of values $S_3$). In this manner, the first long short-term memory layer 320a may utilize information associated with the first set of values $S_1$ and/or the second set of values $S_2$ when the first long short-term memory layer 320a is processing the third set of values $S_3$.

In some example embodiments, the first long short-term memory layer 320a may further selectively pass on information from the processing of the second set of values $S_2$ to a next long short-term memory layer including, for example, the second long short-term memory layer 320b. As such, the second long short-term memory layer 320b may further process and aggregate information derived from the processing of the first set of values $S_1$ and/or the second set of values $S_2$.

The first long short-term memory layer 320a may apply one or more weights in processing each set of values. Similarly, the second long short-term memory layer 320b may also apply one or more weights in further processing and aggregating information from the first long short-term memory layer 320a. According to some example embodiments, training the long short-term memory neural network 305 may include using the long short-term memory neural network 305 to process training data includes sequences of non-anomalous performance metrics but excludes sequence of anomalous metrics. Training the long short-term memory neural network 305 may further include applying supervised learning and/or optimization techniques to adjust the weights to minimize a reconstruction error present in the encoded representation 316 of the sequence 314 of performance metrics provided at the output 304 of the long short-term memory neural network 305. As such, the long short-term memory neural network 305 may be trained to generate the encoded representation 316 with minimal reconstruction error if the sequence 314 of performance metrics includes non-anomalous performance metrics.

Figure 3C:
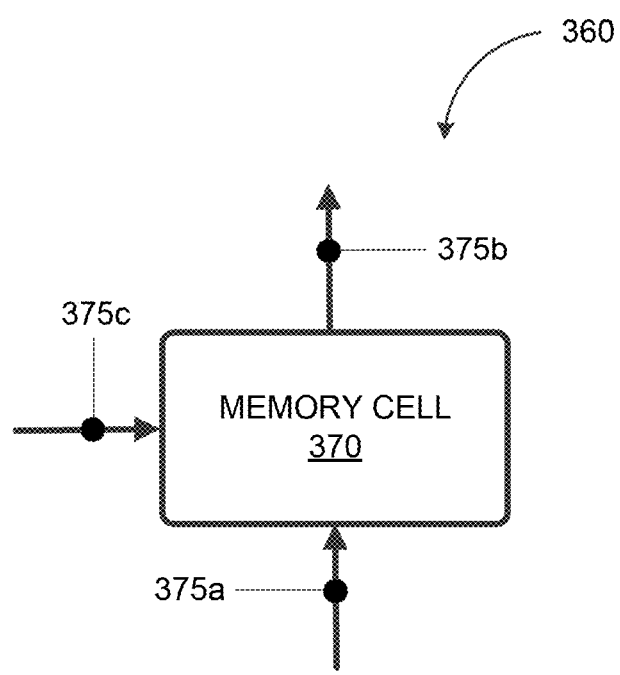
FIG. 3C depicts an example of a long short-term memory cell, in accordance with some example embodiments.

FIG. 3C depicts a long short-term memory block 360, in accordance with some example embodiments. The long short-term memory block 360 may be a component of a long short-term memory neural network. For example, the long short-term memory block 360 may implement the first long short-term memory layer 320a and/or the second long short-term memory layer 320b of the long short-term memory neural network 305. As shown in FIG. 3C, the long short-term memory block 360 may include a memory cell 370 coupled with an input gate 375a, an output gate 375b, and a forget gate 375c.

In some example embodiments, a state c of the long short-term memory block 360 may be controlled by the input 375a, the output 375b, and/or the forget 375c. The long short-term memory block 360 may further be associated with a hidden state h, which has a value corresponding to the one or more tokens encountered by the long short-term memory block 360. The value of the hidden state h may be carried forward as the long short-term memory block 360 continues to process subsequent tokens. Thus, the hidden state h may provide the memory associated with the long short-term memory block. Meanwhile, the input 375a, the output 375b, and/or the forget 375c may each apply an activation function, such as a hard sigmoid function and/or other type of function, to determine a portion of information that should be added to, removed, and/or output from the memory cell 370.

For example, the memory cell 370 may receive, at a time interval t, a set of values $S_t$. The forget 375c may determine whether to remove at least a portion of a value of the state c of the memory cell 370 by applying the activation function σ to the set of values $S_t$ and the value of the previous hidden state $h_{t-1}$. The memory cell 370 may have retained the value of the hidden state $h_{t-1}$ when the long short-term memory block 360 processed a previous set of values $S_{t-1}$ received at an earlier time interval t−1. It should be appreciated that the value of the hidden state $h_{t-1}$ may correspond to a plurality of sets of values from 1 to t−1 that have been processed by the long short-term memory block 360. A portion of information $f_t$ that may be removed from the state c of the memory cell 370 at time t may be given by Equation (2) below:

$$f_t = \sigma(x_f + h_{t-1} \cdot U_f) \tag{2}$$

wherein $x_f = x_t \cdot W_f + b_f$, wherein may denote an inner product, and wherein $U_f$, $W_f$, and $b_f$ may denote the weights that are applied at the forget 375c.

Meanwhile, the input 375a may determine whether to store at least a portion of the current input, for example, the set or values $S_t$, in the memory cell 370 by applying the activation function σ to the set of values $S_t$ and the value of the hidden state $h_{t-1}$. Storing at least a portion of the current input (e.g., the set of values $S_t$) may alter the value of the state c of the long short-term memory block 360. A portion of the information $i_t$ that may be stored to the memory cell 370 may be determined by applying Equation (3) below:

$$i_t = \sigma(x_i + h_{t-1} \cdot U_i) \tag{3}$$

wherein $x_i = x_t \cdot W_i + b_i$, wherein may denote an inner product, and wherein $U_i$, $W_i$, and $b_i$ may denote the weights applied at the input 375a.

The output 375b may determine a portion of the hidden state $h_{t-1}$ that should be output by the long short-term memory block 360. In some example embodiments, the output 375b may determine the portion of the hidden state $h_{t-1}$ to output by applying the activation function σ to the set of values $S_t$ and the value of the hidden state $h_{t-1}$. In some example embodiments, an output $o_t$ of the long short-term memory block 360 at time t may be determined by applying Equation (4) below:

$$o_t = \sigma(x_o + h_{t-1} \cdot U_o) \tag{4}$$

wherein $x_o = x_t \cdot W_o + b_o$, wherein may denote an inner product, and wherein $U_o$, $W_o$, and $b_o$ may denote the weights applied at the output 375b.

In some example embodiments, the addition and/or removal of information from the memory cell 370 may alter the state c of the long short-term memory block 360. The state $c_t$ of the long short-term memory block 360 at time t may be given by the following Equation (5):

$$c_t = f_t \odot c_{t-1} + i \odot \eta(x_c + h_{t-1} \cdot U_c) \tag{5}$$

wherein $x_c = x_t \cdot W_c + b_c$, wherein η may denote a activation function (e.g., hyperbolic tangent function (tan h)), wherein may denote an inner product, wherein ⊙ may denote elementwise multiplication, and wherein $U_c$, $W_c$, and $b_c$ may denote the weights applied to determine the state c of the long short-term memory block 360.

In some example embodiments, the additional and/or removal of information from the memory cell 370 may change the hidden state h stored in the memory cell 370. It should be appreciated that the long short-term memory block 360 may output the hidden state $h_t$ at time t. For instance, the first long short-term memory layer 320a may output, to the second long short-term memory layer 320b, the hidden state $h_t$ of the long short-term memory block 360. The hidden state $h_t$ stored in the memory cell 370 at time t may be given by the following Equation (6):

$$h_t = o_t \odot \eta(c_t) \quad (6)$$

wherein $o_t$ may denote the output of from the long short-term memory block 360 at time t, wherein $c_t$ may denote the state of the long short-term memory block 360 at time t, wherein $\odot$ may denote elementwise multiplication, and wherein $\eta$ may denote an activation function (e.g., hyperbolic tangent function (tan h)).

Figure 4:
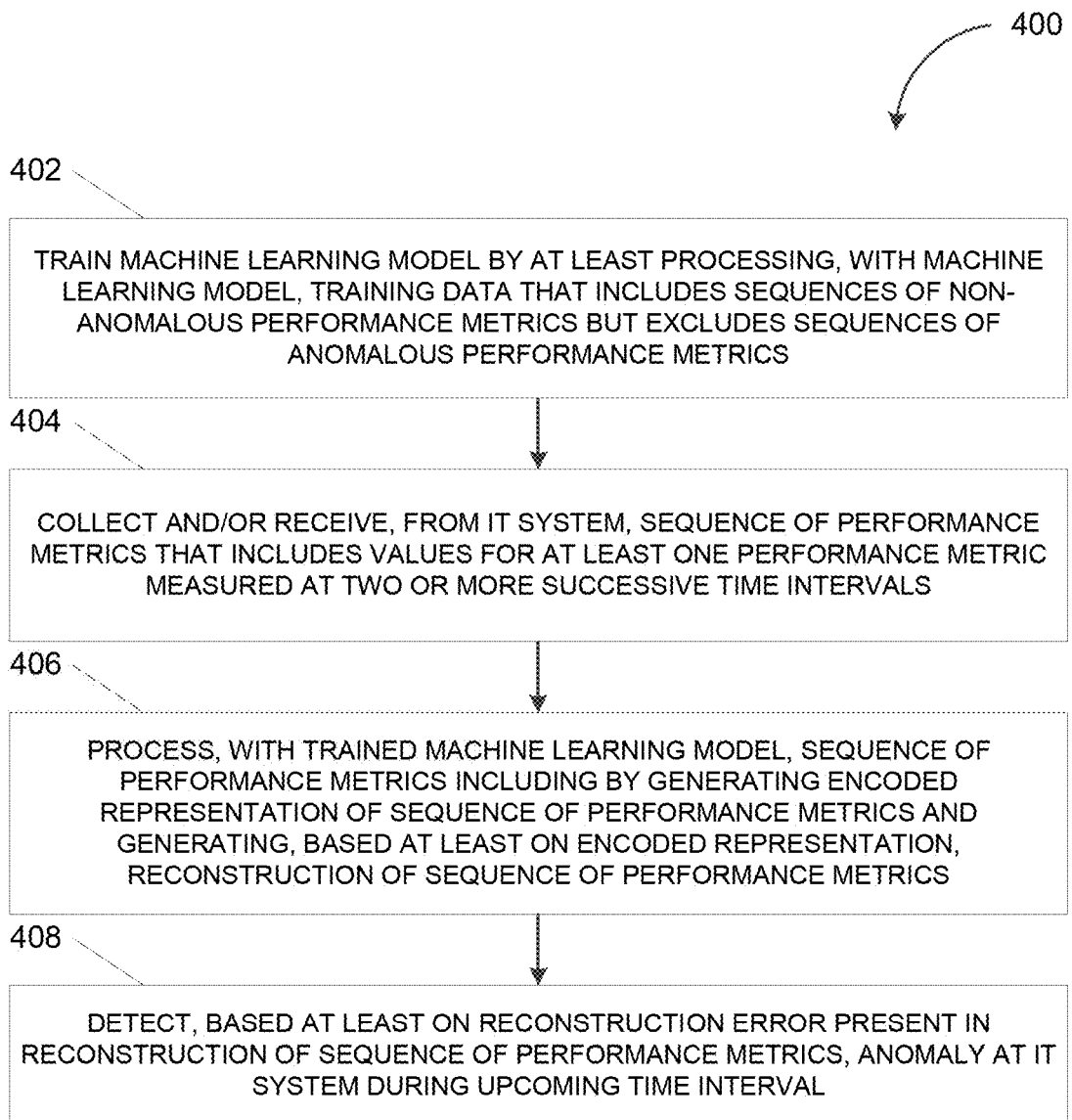
FIG. 4 depicts a flowchart illustrating a process for detecting one or more anomalies in a database system, in accordance with some example embodiments.

FIG. 4 depicts a flowchart illustrating a process 400 for detecting one or more anomalies in an information technology system, in accordance with some example embodiments. Referring to FIGS. 1, 2A-B, 3A-C, and 4, the process 400 may be performed by the anomaly detection engine 110, for example, by the machine learning model 115. For instance, in some example embodiments, the anomaly detection engine 110 may perform the process 400 in order to detect, based on a sequence of performance metrics received and/or collected from the information technology system 140, the occurrence of an anomaly (e.g., a memory outage and/or the like) at the information technology system 140 during an upcoming time interval (e.g., within the next x quantity of time).

At 402, the anomaly detection engine 110 may train the machine learning model 115 by at least processing, with the machine learning model 115, training data that includes one or more sequence of non-anomalous performance metrics but excludes one or more sequences of anomalous performance metrics. In some example embodiments, the machine learning model 115 may include the autoencoder 180, which may include the encoder 312 and the decoder 318. The anomaly detection engine 110 may train the machine learning model 115, for example, the encoder 312, by at least processing, with the machine learning model 115, training data that includes one or more sequences of performance metrics that are received and/or collected from the information technology system 140 (and/or a different information technology system) while the information technology system 140 is operating without encountering any anomalies. The training data may exclude sequences of performance metrics that are received and/or collected from the information technology system 140 (and/or a different information technology system) a certain quantity of time (e.g., 60 minutes or a different quantity of time) prior to and/or during the occurrence of an anomaly (e.g., an out of memory event and/or the like) at the information technology system 140.

Trained in this manner, the encoder 312 included in the machine learning model 115 may be may be able to encode sequences of non-anomalous performance metrics with minimal reconstruction error (e.g., minimal difference between the sequences of non-anomalous performance metrics and the reconstructions generated by the decoder 318 based on the encoded representations of the sequences). Contrastingly, the encoder 312 may be unable to encode sequences of anomalous performance metrics with minimal reconstruction error. Accordingly, the machine learning model 115 may detect an anomaly at the information technology system 140 based at least on the reconstruction error present in the encoded representations generated by the trained encoder 312.

At 404, the anomaly detection engine 110 may collect and/or receive, from the information technology system 140, a sequence of performance metrics that includes values for at least one performance metric measured at two or more successive time intervals. For example, the anomaly detection engine 110 may receive, from the information technology system 140, the sequence 314 of performance metrics indicative of an operational state of the information technology system 140. Examples of performance metrics may include an average quantity of host resident memory, an average quantity of host memory used, a quantity of column store unloads, an average ping length, a count of out of memory events in index server trace file, an average size of host swap, and/or the like. Moreover, the sequence 314 of performance metrics may include, for example, at least one performance metric received and/or collected from the information technology system 140 at successive time intervals including, for example, a first time interval, a second time interval, a third time interval, and/or the like.

For example, at each of the time intervals T0, T1, T2, T3, T4, and T5, the anomaly detection engine 110 may receive and/or collect, from the information technology system 140, a set of values for each of the six performance metrics M1, M2, M3, M4, M5, and M6. That is, at the first time interval T0, the anomaly detection engine 110 may receive and/or collect, from the information technology system 140, a first set of values $S_1$ for the six performance metrics M1, M2, M3, M4, M5, and M6 that includes the values $v_{1,0}$, $v_{2,0}$, $v_{3,0}$, $v_{4,0}$, $v_{5,0}$, and $v_{6,0}$. At the second time interval T2, the anomaly detection engine 110 may receive and/or collect from the information technology system 140, a second set of values $S_2$ for the six performance metrics M1, M2, M3, M4, M5, and M6 that includes the values $v_{1,1}$, $v_{2,1}$, $v_{3,1}$, $v_{4,1}$, $v_{5,1}$, and $v_{6,1}$. The anomaly detection engine 110 may receive additional sets of values including, for example, $S_3$, $S_4$, $S_5$, and $S_6$ for the six performance metrics M1, M2, M3, M4, M5, and M6 during the subsequent time intervals T2, T3, T4, T5, and/or the like.

At 406, the anomaly detection engine 110 may process, with the trained machine-learning model 115, the sequence of performance metrics including by generating an encoded representation of the sequence of performance metrics and generating, based at least on the encoded representation, a reconstruction of the sequence of performance metrics. For example, as shown in FIG. 3A, the machine learning model 115 may include the encoder 312 and the decoder 318. The encoder 312 may be trained to generate, based at least on the sequence 140 of performance metrics, the encoded representation 316 of the sequence 140 of performance metrics. As noted, the encoder 312 may be trained to generate the encoded representation 316 with minimal reconstruction error if the sequence 140 of performance metrics excludes anomalous performance metrics associated with anomalies at the information technology system 140 (e.g., an out of memory event and/or the like). The decoder 318 may be configured to generate, based at least on the encoded representation 316, the reconstruction 322 of the sequence 140 of performance metrics. Minimal reconstruction errors may be present in the reconstruction 322 of the sequence 140 of performance metrics if the sequence 140 of performance metrics excludes anomalous performance metrics associated with anomalies at the information technology system 140.

At 408, the anomaly detection engine 110 may detect, based at least on a reconstruction error present in the reconstruction of the sequence of performance metrics, an anomaly at the information technology system during an upcoming time interval. In some example embodiments, because the encoder 312 is trained based on training data that includes sequences of non-anomalous performance metrics but excludes sequences of anomalous performance metrics, minimal reconstruction errors may be present in the reconstruction 322 of the sequence 140 of performance metrics, which the decoder 318 may generate based on the encoded representation 316, if the sequence 140 of performance metrics excludes anomalous performance metrics associated with anomalies at the information technology system 140.

Accordingly, as shown in FIG. 3A, the comparator 185 may determine, based at least on a difference between the sequence 314 of performance metrics and the reconstruction 322 of the sequence 314 generated by the decoder 318, a value corresponding to the reconstruction error present in the encoded representation 316 of the sequence 314 generated by the encoder 312. The machine learning model 115 may detect an anomaly at the information technology system 140, for example, during an upcoming time interval, if the reconstruction error exceeds a threshold value. For example, as shown in FIG. 2B, the reconstruction error present in the sequence 314 may begin to increase prior to the occurrence of an anomaly at the information technology system 140 and may peak at the time of the anomaly before decreasing and remaining low as the information technology system 140 resumes normal operation. As such, the machine learning model 115 may detect the anomaly prior to the occurrence of the anomaly based at least on the reconstruction error associated with the sequence 314 of performance metrics from the information technology system 140 exceeding a threshold value.

Figure 5:
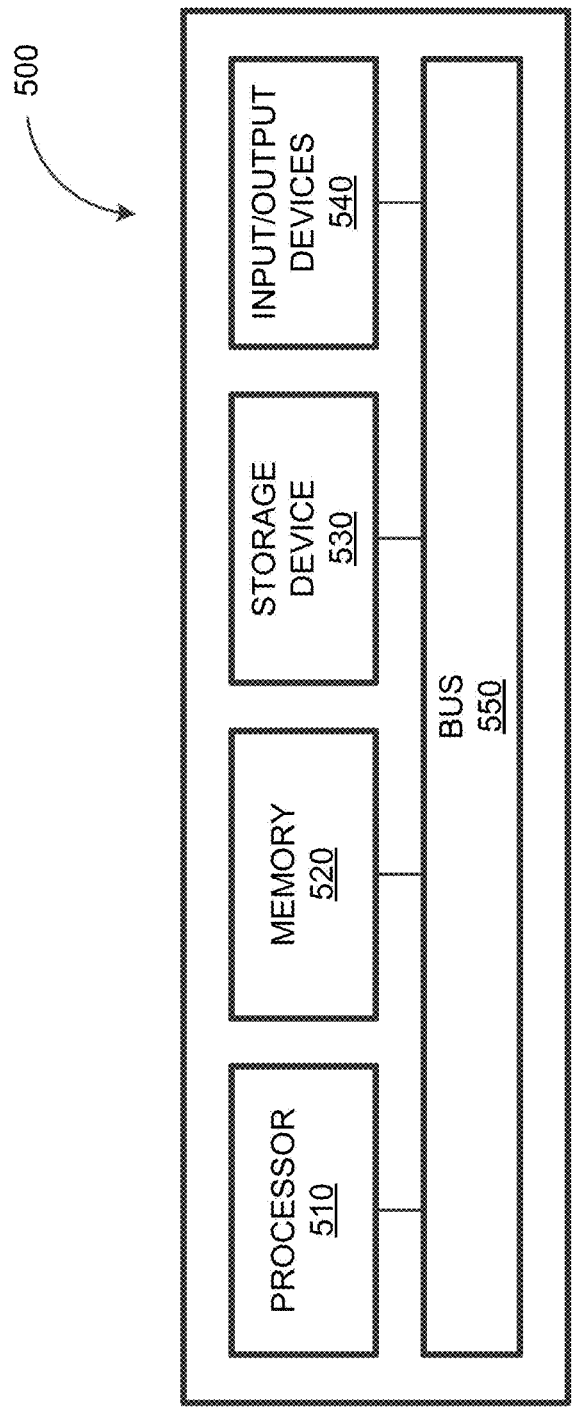
FIG. 5 depicts a block diagram illustrating a computing system, in accordance with some example embodiments.

FIG. 5 depicts a block diagram illustrating a computing system 500 consistent with implementations of the current subject matter. Referring to FIGS. 1 and 5, the computing system 500 can be used to implement the anomaly detection engine 110 and/or any components therein.

As shown in FIG. 5, the computing system 500 can include a processor 510, a memory 520, a storage device 530, and input/output devices 540. The processor 510, the memory 520, the storage device 530, and the input/output devices 540 can be interconnected via a system bus 550. The processor 510 is capable of processing instructions for execution within the computing system 500. Such executed instructions can implement one or more components of, for example, the recommendation engine 110. In some example embodiments, the processor 510 can be a single-threaded processor. Alternately, the processor 510 can be a multi-threaded processor. The processor 510 is capable of processing instructions stored in the memory 520 and/or on the storage device 530 to display graphical information for a user interface provided via the input/output device 540.

The memory 520 is a computer readable medium such as volatile or non-volatile that stores information within the computing system 500. The memory 520 can store data structures representing configuration object databases, for example. The storage device 530 is capable of providing persistent storage for the computing system 500. The storage device 530 can be a floppy disk device, a hard disk device, an optical disk device, or a tape device, or other suitable persistent storage means. The input/output device 540 provides input/output operations for the computing system 500. In some example embodiments, the input/output device 540 includes a keyboard and/or pointing device. In various implementations, the input/output device 540 includes a display unit for displaying graphical user interfaces.

According to some example embodiments, the input/output device 540 can provide input/output operations for a network device. For example, the input/output device 540 can include Ethernet ports or other networking ports to communicate with one or more wired and/or wireless networks (e.g., a local area network (LAN), a wide area network (WAN), the Internet).

In some example embodiments, the computing system 500 can be used to execute various interactive computer software applications that can be used for organization, analysis and/or storage of data in various formats. Alternatively, the computing system 500 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities (e.g., SAP Integrated Business Planning as an add-in for a spreadsheet and/or other type of program) or can be standalone computing products and/or functionalities. Upon activation within the applications, the functionalities can be used to generate the user interface provided via the input/output device 540. The user interface can be generated and presented to a user by the computing system 500 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A system, comprising:
   at least one data processor; and
   at least one memory storing instructions which, when executed by the at least one data processor, result in operations comprising:
   training, based at least on training data, a machine learning model to detect an anomaly at an information technology system, the training data including one or more sequences of non-anomalous performance metrics associated with a non-anomalous operation at the information technology system, and the training data excluding one or more sequences of anomalous performance metrics associated with the anomaly occurring at the information technology system;
   applying the trained machine learning model to process a sequence of performance metrics from the information technology system, the processing includes generating, by the trained machine learning model, an encoded representation of the sequence of performance metrics, and the processing further includes the machine learning model generating, based at least on the encoded representation, a reconstruction of the sequence of performance metrics; and
   detecting, based at least on a reconstruction error present in reconstruction of the sequence of performance metrics, an occurrence of the anomaly at the information technology system.

2. The system of claim 1, wherein the machine learning model includes an encoder trained to generate, based at least on the sequence of performance metrics, the encoded representation.

3. The system of claim 2, wherein the machine learning model further includes a decoder trained to generate, based at least on the encoded representation, the reconstruction of the sequence of performance metrics.

4. The system of claim 3, wherein the encoder and the decoder each comprise a long short-term memory neural network.

5. The system of claim 1, wherein the sequence of performance metrics includes values for at least one performance metric measured at two or more successive time intervals at the information technology system.

6. The system of claim 5, wherein the at least one performance metric include an average quantity of host resident memory, an average quantity of host memory used, a quantity of column store unloads, an average ping length, a count of out of memory events in index server trace file, and/or an average size of host swap.

7. The system of claim 1, wherein the reconstruction error comprises a difference between the sequence of performance metrics and the reconstruction of the sequence of performance metrics.

8. The system of claim 1, wherein the occurrence of the anomaly at the information technology system is detected based at least on the reconstruction error exceeding a threshold value.

9. The system of claim 1, wherein the anomaly comprises a memory outage at the information technology system.

10. The system of claim 1, wherein the information technology system includes a plurality of interconnected managed objects, and wherein the plurality of interconnected managed objects include one or more databases, hosts, application servers, and/or network devices.

11. A computer-implemented, comprising:
    training, based at least on training data, a machine learning model to detect an anomaly at an information technology system, the training data including one or more sequences of non-anomalous performance metrics associated with a non-anomalous operation at the information technology system, and the training data excluding one or more sequences of anomalous performance metrics associated with the anomaly occurring at the information technology system;

applying the trained machine learning model to process a sequence of performance metrics from the information technology system, the processing includes generating, by the trained machine learning model, an encoded representation of the sequence of performance metrics, and the processing further includes the machine learning model generating, based at least on the encoded representation, a reconstruction of the sequence of performance metrics; and detecting, based at least on a reconstruction error present in reconstruction of the sequence of performance metrics, an occurrence of the anomaly at the information technology system.

12. The method of claim 11, wherein the machine learning model includes an encoder trained to generate, based at least on the sequence of performance metrics, the encoded representation, and wherein the machine learning model further includes a decoder trained to generate, based at least on the encoded representation, the reconstruction of the sequence of performance metrics.

13. The method of claim 11, wherein the sequence of performance metrics includes values for at least one performance metric measured at two or more successive time intervals at the information technology system.

14. The method of claim 13, wherein the at least one performance metric include an average quantity of host resident memory, an average quantity of host memory used, a quantity of column store unloads, an average ping length, a count of out of memory events in index server trace file, and/or an average size of host swap.

15. The method of claim 11, wherein the reconstruction error comprises a difference between the sequence of performance metrics and the reconstruction of the sequence of performance metrics, and wherein the occurrence of the anomaly at the information technology system is detected based at least on the reconstruction error exceeding a threshold value.

16. The method of claim 11, wherein the anomaly comprises a memory outage at the information technology system.

17. The method of claim 11, wherein the information technology system includes a plurality of interconnected managed objects, and wherein the plurality of interconnected managed objects include one or more databases, hosts, application servers, and/or network devices.

18. A non-transitory computer readable medium storing instructions, which when executed by at least one data processor, result in operations comprising:

training, based at least on training data, a machine learning model to detect an anomaly at an information technology system, the training data including one or more sequences of non-anomalous performance metrics associated with a non-anomalous operation at the information technology system, and the training data excluding one or more sequences of anomalous performance metrics associated with the anomaly occurring at the information technology system;

applying the trained machine learning model to process a sequence of performance metrics from the information technology system, the processing includes generating, by the trained machine learning model, an encoded representation of the sequence of performance metrics, and the processing further includes the machine learning model generating, based at least on the encoded representation, a reconstruction of the sequence of performance metrics; and detecting, based at least on a reconstruction error present in reconstruction of the sequence of performance metrics, an occurrence of the anomaly at the information technology system.

* * * * *